United States Patent [19]

Christensen

[11] Patent Number: 4,592,116
[45] Date of Patent: Jun. 3, 1986

[54] ROPE SECURING DEVICE

[76] Inventor: Harold B. Christensen, 860 Missouri Ave., Longmont, Colo. 80501

[21] Appl. No.: 687,571

[22] Filed: Dec. 28, 1984

[51] Int. Cl.[4] ............................................. F16G 11/00
[52] U.S. Cl. ................................. 24/132 R; 24/115 G; 24/134 R; 24/136 R
[58] Field of Search ............ 24/132 R, 115 G, 115 R, 24/134 N, 134 R, 136 R; 403/374; 215/238, 240

[56] References Cited

U.S. PATENT DOCUMENTS

| | | | |
|---|---|---|---|
| 295,799 | 3/1884 | Patton | 24/132 R |
| 546,903 | 9/1895 | Ryan | 24/132 R |
| 578,365 | 3/1897 | Sharp | 24/136 R |
| 697,404 | 4/1902 | Grundy | 24/134 E |
| 722,978 | 3/1903 | Hardinge | 215/238 |
| 744,730 | 11/1903 | Dusang | 24/134 N |
| 928,367 | 7/1909 | De Witt | 24/115 G |
| 1,087,093 | 2/1914 | Tarbox | 24/136 R |
| 2,137,858 | 11/1938 | Schwabacher | 24/136 R |
| 2,197,877 | 4/1940 | Racen | 24/115 G |
| 2,331,224 | 10/1943 | Pingel | 24/132 R |
| 2,448,384 | 8/1948 | Meinzinger | 24/115 G |
| 2,478,994 | 8/1949 | White | 24/132 R |
| 2,634,474 | 4/1953 | Grayson | 24/115 G |
| 3,698,042 | 10/1972 | Hirschhorn | 24/115 G |
| 3,811,155 | 5/1974 | Stafford | 24/136 R |
| 3,852,943 | 12/1974 | Healy | 24/134 R |
| 4,091,815 | 5/1978 | Larsen | 24/134 R |
| 4,328,605 | 5/1982 | Hutchison et al. | 24/115 G |
| 4,450,603 | 5/1984 | Hirsch | 24/134 N |

FOREIGN PATENT DOCUMENTS 7426 of 1908 United Kingdom ............ 24/132 R

Primary Examiner—Victor N. Sakran
Attorney, Agent, or Firm—O'Rourke & Harris

[57] ABSTRACT

A securing device is disclosed for use in conjunction with a rope or like article to secure the positioning thereof. The securing device is coarsely adjustable to establish the maximum permissible spacing between a pair of clamping plates when the device is in an open position. The clamping plates are configured to allow dual sections of rope to be received through the securing device between the plates while the device is in the open position, with the rope being engageable with the plates at a plurality of points when in the closed position. A camming unit is mounted adjacent to the outside surface of one plate, with the camming unit having a cam surface, that acts in conjunction with the adjacent plate, and an actuating lever, the positioning of which establishes the open and closed positions of the lever and device. The cam surface has a first contour to cause the clamping plates to be brought toward one another as the lever is moved from the open position to the closed position, and has a second contour, operable when the lever is in the closed position, to resist movement of the lever away from the closed position. When in the closed position, the free end of the lever is contiguous to the outer surface of the adjacent plate, and the lever is releasably locked in this position by means of both a bail and a locking pin.

6 Claims, 5 Drawing Figures

ROPE SECURING DEVICE

FIELD OF THE INVENTION

This invention relates to a securing device, and, more particularly, relates to a releasable securing device for maintaining the positioning of a rope or like article.

BACKGROUND OF THE INVENTION

Securing, or fastening, devices for ropes and the like are well known. In addition, such devices have been heretofore known to include releasable features. Such devices have not, however, been relatively simple, dependable in both operation and use, capable of easy installation, readily releasable, and/or dependably locked when in the closed position securing the positioning of the rope.

With respect to prior art, the patents to Hirsch (U.S. Pat. No. 4,450,603), Hirschhorn (U.S. Pat. No. 3,698,042), Grayson (U.S. Pat. No. 2,634,474) and Hutchison et al (U.S. Pat. No. 4,328,605) show rope locking devices that depend upon misaligned aperture clamps, while the patents to Stafford (U.S. Pat. No. 3,811,155) and Crowe (U.S. Pat. No. 722,949) show devices with camtype locking means.

SUMMARY OF THE INVENTION

This invention provides an improved securing device that is particularly useful in maintaining the desired positioning of a rope or like article. The securing device includes a pair of clamping plates the initial positioning between which is established by coarse positioning and the final positioning between which, at the closed, or clamped, position of the device, is controlled by a camming unit that is lockable in the closed position.

It is therefore an object of this invention to provide an improved securing device for a rope or like article.

It is another object of this invention to provided an improved securing device for a rope or like article that is relatively simple and yet is dependable in both operation and use.

It is still another object of this invention to provide an improved securing device for a rope or like article that is capable of easy installation and yet is readily releasable and dependably lockable when in the closed, or clamped, position.

It is still another object of this invention to provide an improved securing device that utilizes a pair of clamping plates the initial positioning of which is established by coarse positioning and the final positioning of which, to clamp a rope or the like in position, is controlled by a camming unit.

It is yet another object of this invention to provide an improved securing device for a rope or like article that utilizes a camming unit having locking means for dependably locking the device in the closed position.

With these and other objects in view, which will become apparent to one skilled in the art as the description proceeds, this invention resides in the novel construction, combination, and arrangement of parts substantially as hereinafter described and more particularly defined by the appended claims, it being understood that changes are meant to be included as come with in the scope of the claims.

DESCRIPTION OF THE DRAWINGS

The accompany drawings illustrate a complete embodiment of the invention according to the best mode so far devised for the practical application of the principles thereof, and in which.

DESCRIPTION OF THE INVENTION

Figure 1:
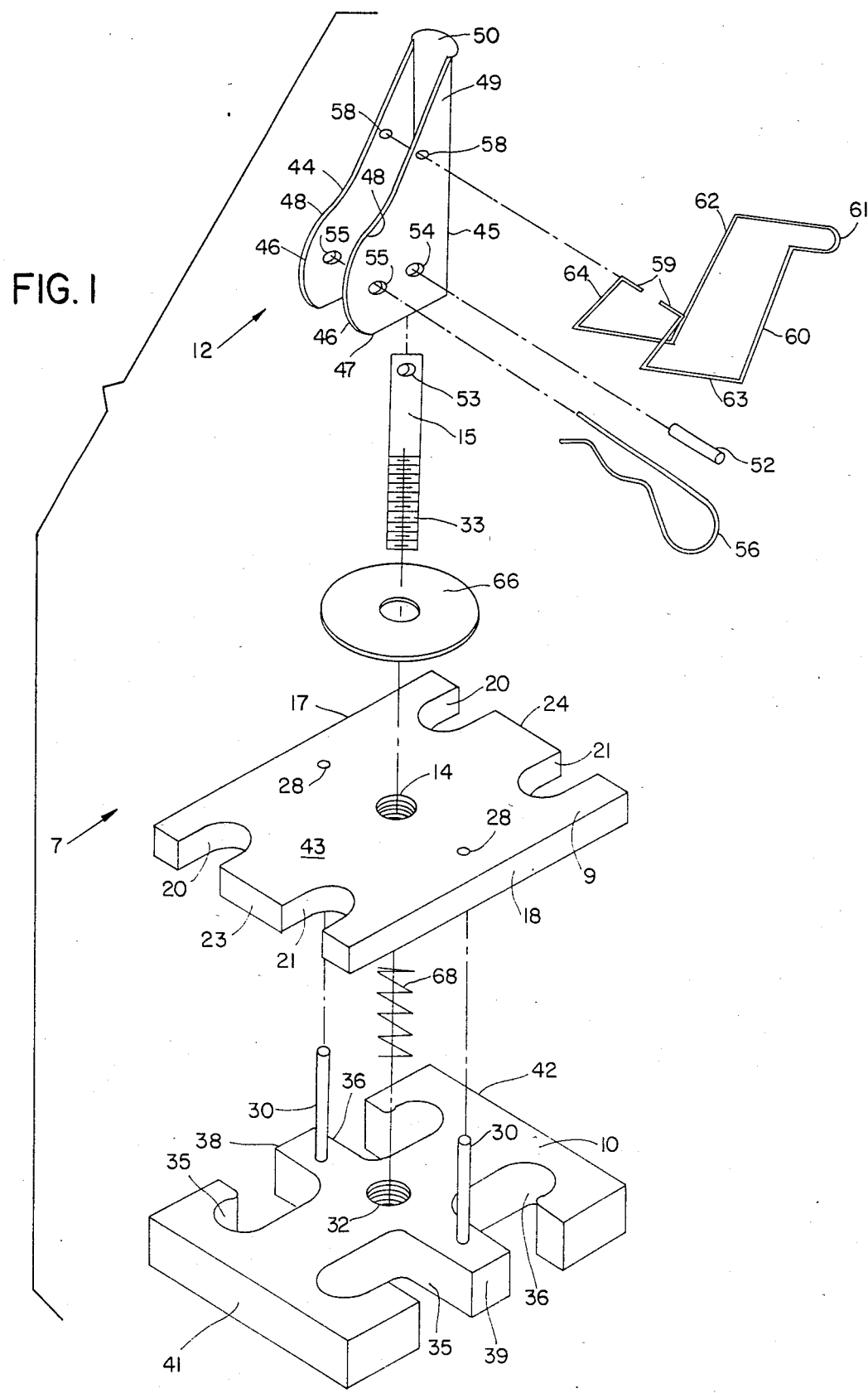
FIG. 1 is an exploded perspective view of the securing device of this invention.

As shown best in FIG. 1, securing device 7 includes a pair of clamping plates 9 and 10 and a camming unit 12.

Plate 9 is preferably rectangular in shape, with a thickness sufficient to make the plate rigid. Plate 9 has a central aperture 14 through which a positioning pin 15 extends with pin 15 being freely movable in axial directions of the pin within central aperture 14.

Figure 4:
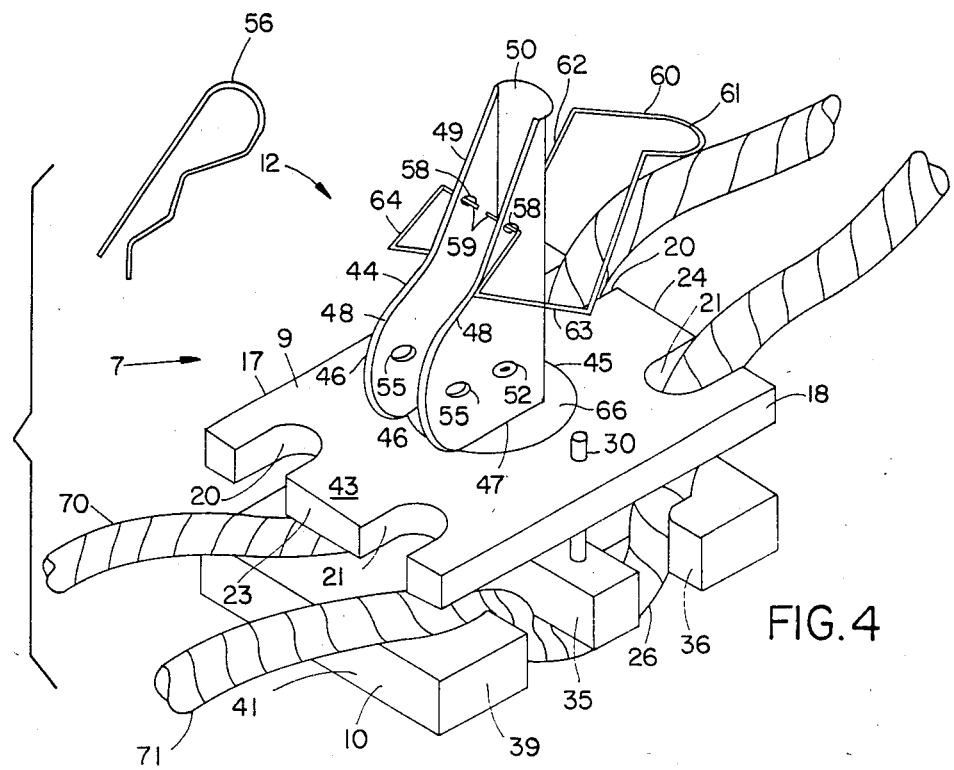
FIG. 4 is a perspective view of the securing device as shown FIG. 2 in an open position and illustrating placement in the device of a rope to be positively maintained.
Figure 5:
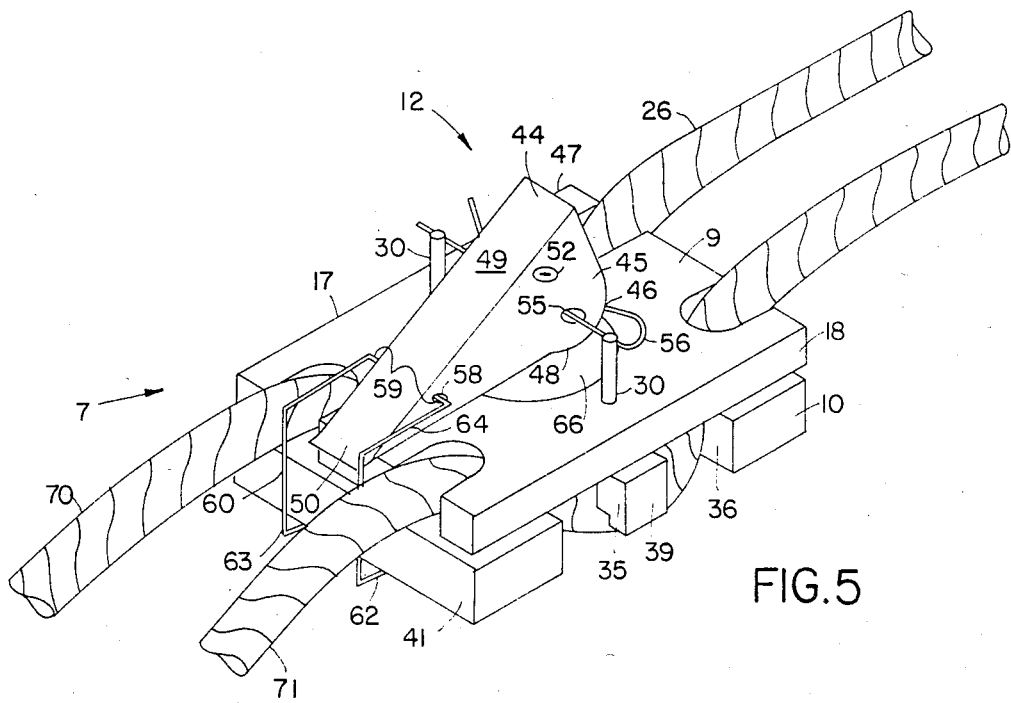
FIG. 5 is a perspective view of the securing device as shown in FIG. 3 in the closed position and illustrating clamping of a rope between the plates to secure the positioning of the rope.

Plate 9 also has uniform side walls 17 and 18 and a pair of notches 20 and 21 at each of the opposite ends 23 and 24, respectively of the plate, with the size of the notches being selected as needed for the size rope 26 (as shown in FIGS. 4 and 5) to be secured. In addition, plate 9 has a pair of small diameter apertures 28 extending through the plate, with these apertures being offset from central aperture 14, at opposite sides, with apertures 28 receiving guide pins 30 which are freely movable in axial directions with respect to apertures 28.

Base clamping plate 10 is also preferably rectangular in shape and preferably has the same length and width as does plate 9, but preferably has a greater thickness than does plate 9 (as illustrated in the drawings). Plate 10 has a threaded central aperture 32 to snugly receive the lower threaded portion 33 of pin 15. Plate 10 also has a pair of generally L-shaped notches 35 and 36 therein opening to each of the sides 38 and 39, respectively, and a pair of uniform side walls 41 and 42.

In addition, plate 10 has guide pins 30 mounted therein between notches 35 and 36 and extending therefrom toward (and through) the apertures 28 in plate 9 when the unit is assembled. As shown best in FIGS. 2 and 3, the guide pins are positioned to maintain plates 9 and 10 aligned with one another during relative movement between the plates of the assembled device.

Camming unit 12 is mounted adjacent to outer surface 43 of plate 9. Camming unit 12 includes an actuating assembly 44 that is generally formed into a U-shape with the base portion 45 having a pair of walls that extent parallel to one another. Camming unit 12 has a pair of curved cam surfaces 46 at the edges of the parallel walls of base portion 45, each of which cam surfaces terminates at one side at a flat surface 47 at the bottom of the assembly, and terminates at the other side at a curved surface 48 that has a greater rate of curvature than does cam surface 46.

A lever 49 extends outwardly from base portion 45 and the free end of lever 49 has a tab 50 used to facilitate ease of operation of the lever.

A mounting, pin 52 extends through aperture 53 at the other end of positioning pin 15 and through apertures 54 in the base portion 45 of actuating assembly 44 to establish a pivot point for the actuating assembly. In addition, base portion 45 has apertures 55 therethrough to receive locking pin 56 for locking the device in the closed position. Also, lever 49 of actuating assembly 44 has apertures 58 therethrough to receive the opposite ends 59 of bail 60.

Figure 3:
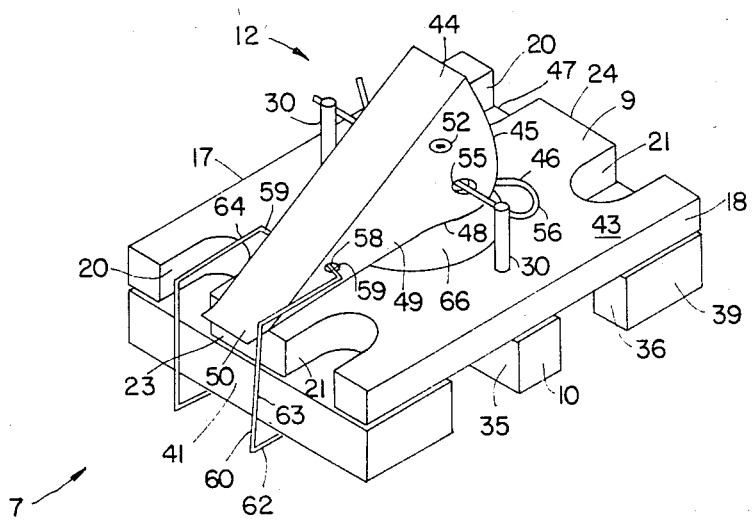
FIG. 3 is a perspective view of the securing device as shown in FIG. 1 with the device assembled and in the closed and locked position.

Bail 60 is a wire structure bent, or shaped, to have a pair of parallel extending branches extending from a tab portion 61 to a plate engaging portion 62 (which is normal to the tab portion and is received under plate 10 when the bail is in the locking position as shown in FIGS. 3 and 5). The plate engaging portion extends to a middle portion 63 (which is normal to plate engaging portion 62 and parallel to tab portion 61, with portion 63 being adjacent to the ends 23 and 41 of plates 9 and 10 when the bail is in the locked position, as again shown in FIGS. 3 and 4). The middle portion then extends to a bridging portion 64 (which extends outwardly at an angle of about 45 degrees with respect to middle portion 63 and terminates at ends 59 of the wire).

As shown best in FIG. 1, a washer 66 is preferably utilized at the outer surface 43 of plate 9 and has positioning pin 15 extending therethrough so that the cam surface 46, flat surface 47, and maintaining surface 48 of the cam engages washer 66 rather than directly engaging the outer surface 43 of plate 9.

In addition, a spring 68 extends around positioning pin 15 between plates 9 and 10 to bias the plates to the maximum spacing therebetween when the device is assembled. As indicated in FIG. 1, a recess is preferably provided at the inner surfaces of plates 9 and 10 at the central apertures 14 and 32 to receive the opposit ends of the spring.

In a working embodiment of the device of this invention, plate 9 was a steel plate having dimensions of about $3\frac{1}{8}'' \times 2\frac{1}{8}'' \times \frac{1}{4}''$, plate 10 was a steel plate having dimensions of about $3\frac{1}{8}'' \times 2\frac{1}{8}'' \times \frac{3}{8}''$, positioning pin 15 was a $\frac{1}{4}''$ diameter bolt, actuating assembly 44 was formed of 1/16'' thick steel, bail 60 was formed of 1/16th'' wire, locking pin 56 was formed of 1/36'' diameter steel material, and spring 68 was 0.7 inches in length. It is to be realized, however, that the material and dimensions set forth are meant to be examples only, and the invention is not meant to be be limited thereto. For example, the dimensions of the clamping plates could be varied as could the shape, and the plates could be made of other material, such as plastic. In like manner, the other components could be varied as would be apparent to one skilled in the art.

Figure 2:
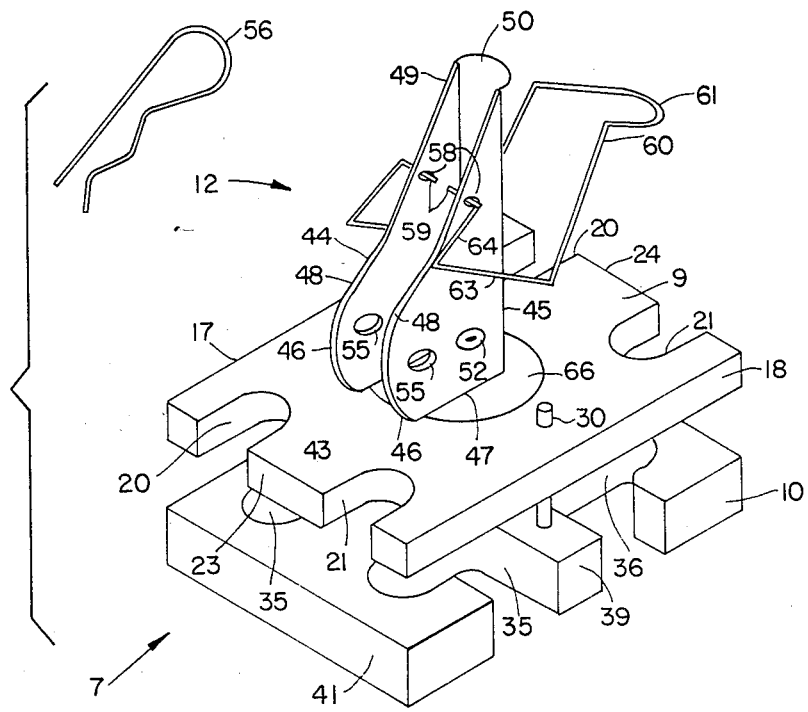
FIG. 2 is a perspective view of the securing device shown in FIG. 1 with the device assembled and in an open position.

The device is assembled by passing positioning pin 15 through washer 66, plate 9 and spring 68, and then screwing pin 15 into the threads in central aperture 32 of plate 10. The maximum positioning between the plates is established by how far positioning pin 15 is screwed into plate 10 since the outer surface 43 of plate 9 rests against flat surface 47 of actuating assembly 44 (when the device is in the open position as shown in FIG. 2). This establishes coarse positioning for the device.

When in the open position, as shown best in FIG. 2, locking pin 56 is withdrawn from apertures 55, and bail 60 is withdrawn from engagement with the outer surface of plate 10. As indicated in FIG. 2, bail 60 may be pivoted so that tab 61 is behind tab 50 of lever 49.

In operation (and as illustrated by FIGS. 4 and 5), the two sections 70 and 71 of rope 26 are threaded through the device at the opposite sides thereof so that each section of the rope extends inwardly from each end of the device (i.e., in and adjacent to the notches 20 and 21 in upper plate 9) and downwardly through the notches 35 and 36 in lower plate 10 to form a loop at the outside thereof. In other words, each section of rope passes between the plates, and each end (through notches 20 and 21 in upper plate 9), and each section then makes a loop through and outside the base plate 10 (through notches 35 and 36 which open to the sides). Channels are thus formed for the rope when the rope is in the proper clamping position in the device.

As can be appreciated from the foregoing, and in view of FIG. 4, the rope is easily insertable into the device when in the open position. If, however, the coarse positioning is not adequate for the rope to be secured, the coarse positioning can be quickly adjusted by either screwing (or unscrewing) positioning pin 15 into (or out of) plate 10 to adjust the maximum permissible positioning between the plates.

After the rope has been inserted into the device, lever 49 is actuated from the open position (as shown in FIG. 4) to the closed position (as shown in FIG. 5). As shown, actuation of lever 49 causes cam surface 46 to move plate 9 toward plate 10 to securely clamp the rope therebetween with the clamping plates engaging the rope at a plurality of points.

The force exerted by the clamping plates on the rope may be varied, of course, by the coarse positioning established by positioning pin 15 since the cam will decrease plate spacing by a predetermined amount when the lever is actuated from the open position to the closed position. As shown best in FIG. 1, camming surface 46 is contoured so that, as lever 49 is brought to the closed position, maintaining surface 48 is brought into engagement with plate 9 (i.e., with washer 66 that rides on outer surface 43 of plate 9) to provide an overcentered relationship such that motion of lever 49 from the closed position toward the open position is resisted by the camming unit. As shown best in FIG. 5, tab 50 of lever 44 is contiguous to end 23 of plate 9 when in the closed position to help prevent undesired actuation, of the lever.

While maintaining surface 48 opposes release of the camming unit from the closed position, placement of locking pin 56 through apertures 55 will assure that the lever remains in the closed position. In addition, by utilizing bail 60 so that the bail is around and in engagement with the outer surface of plate 10, further locking security is afforded.

As can be appreciated from the foregoing, this invention provides an improved security device that is particularly useful in reliably securing the positioning of a rope or the like.

What is claimed is:

1. A securing device for securing the positioning of a rope-like article, said device comprising:
   a first plate having notches therein for receiving a rope-like article to be secured, said first plate having a central aperture;
   a second plate adjacent to first plate and having notches therein for receiving said rope-like article to be secured, said second plate having a central aperture with threads therein;

a mounting pin having threads on one end portion thereof, and a second end portion, said mounting pin being received through said central aperture of said first plate and having said threads on said one end portion mating with said threads of said central aperture of said second plate to establish coarse positioning between said plates; and an actuator mounted on said end portion of said mounting pin, said actuator having a cam adjacent to said first plate to cause movement of said first plate towards said second plate upon actuation of said cam to the closed position, said actuator also having a lever for actuating said cam.

2. The device of claim 1 wherein said device includes a spring between said plates to bias said plates to the maximum spacing therebetween as established by said mounting pin, and wherein said device also includes guide means mounted on one of said plates and extending through the other of said plates for guiding said one plate during relative movement therebetween.

3. The device of claim 1 wherein said device includes locking means connected with said actuator for positively locking said actuator against movement from said closed position.

4. The device of claim 3 wherein said locking means includes a bail extending from said actuator over said plates when said actuator is in said closed position to thereby lock said actuator in said closed position.

5. The device of claim 3 wherein said locking means includes a locking pin extending through said actuator to preclude movement of said lever when said actuator is in said closed position.

6. The device of claim 1 wherein said first plate has a rectangular shape with said notches therein opening to the ends of said plate, and wherein said second plate has a rectangular shape substantially the same as said first plate with said notches therein opening to the sides of said plate, whereby said rope-like article is received in said notches in the opposite ends of said first plate and is received through said notches in the opposite sides of said second plate with said article extending therefrom to form a loop outside said second plate.

* * * * *